(12) United States Patent
Alvarez Baladron et al.

(10) Patent No.: US 12,281,043 B2
(45) Date of Patent: Apr. 22, 2025

(54) ARTIFICIAL AGGLOMERATED STONE

(71) Applicant: COSENTINO RESEARCH & DEVELOPMENT, S.L., Cantoria-Almeria (ES)

(72) Inventors: Beatriz Alvarez Baladron, Cantoria-Almeria (ES); Daniel Risueno Moreno, Cantoria-Almeria (ES)

(73) Assignee: Cosentino Research & Development, S.L., Cantoria-Almeria (ES)

( * ) Notice: Subject to any disclaimer, the term of this patent is extended or adjusted under 35 U.S.C. 154(b) by 560 days.

(21) Appl. No.: 17/807,167

(22) Filed: Jun. 16, 2022

(65) Prior Publication Data

US 2023/0102910 A1 Mar. 30, 2023
US 2023/0303438 A9 Sep. 28, 2023

(30) Foreign Application Priority Data

Sep. 24, 2021 (EP) ..................................... 21382860

(51) Int. Cl.
| C04B 14/14 | (2006.01) |
| C04B 14/28 | (2006.01) |
| C04B 26/18 | (2006.01) |
| C04B 40/00 | (2006.01) |
| C04B 111/10 | (2006.01) |
| C04B 111/54 | (2006.01) |

(52) U.S. Cl.
CPC .............. *C04B 14/14* (2013.01); *C04B 14/28* (2013.01); *C04B 26/18* (2013.01); *C04B 40/0067* (2013.01); *C04B 40/0089* (2013.01); *C04B 2111/1037* (2013.01); *C04B 2111/542* (2013.01)

(58) Field of Classification Search
CPC ....... C04B 14/14; C04B 14/28; C04B 14/041; C04B 20/008; C04B 26/18; C04B 40/0067; C04B 40/0089; C04B 40/0071; C04B 2111/1037; C04B 2111/542; C04B 2111/54; C04B 2111/545
See application file for complete search history.

(56) References Cited

U.S. PATENT DOCUMENTS

2006/0138385 A1  6/2006  Yamanashi et al.

FOREIGN PATENT DOCUMENTS

| CN | 107698194 A | 2/2018 |
| EP | 2 216 305 A1 | 8/2010 |
| WO | WO 2007/014809 A1 | 8/2007 |
| WO | WO 2021/069464 A1 | 4/2021 |

OTHER PUBLICATIONS

Benedetto et al., "Chemical variability of artificial stone powders in relation to their health effects," Scientific Reports, vol. 9, No. 1, Apr. 25, 2019 (whole document).

European Search Report dated Mar. 7, 2022, EP Application No. 21382860.1.

*Primary Examiner* — Anthony J Green
(74) *Attorney, Agent, or Firm* — Finnegan, Hendeson, Farabow, Garrett & Dunner, LLP

(57) ABSTRACT

The present disclosure relates to an artificial agglomerated stone comprising micronized feldspar and to a method for its manufacturing.

23 Claims, No Drawings

ARTIFICIAL AGGLOMERATED STONE

This application claims priority to EP Application No. 21382860.1, filed 24 Sep. 2021; the disclosure of this application is incorporated herein by reference in its entirety.

The present disclosure is related to materials for construction, decoration and architecture, made of artificial agglomerated stone, as well as to their manufacture and fabrication. Particularly, the present disclosure falls within the technological field of artificial stone articles composed of inorganic fillers selected from stone, stone-like or ceramic materials, and a hardened organic resin, manufactured by a process which includes vacuum vibrocompaction and hardening of unhardened agglomerated mixtures.

BACKGROUND

Artificial agglomerated stone articles which frequently simulate natural stones, also known as engineered stone articles, are common in the construction, decoration, architecture and design sectors. The processes for their manufacture at industrial scale are well established nowadays.

One of the most popular artificial stone materials, highly appreciated by their aesthetic, hardness and resistance to staining and wear, are the so-called quartz agglomerated surfaces. They are extensively used for countertops, claddings, floorings, sinks and shower trays, to name a few applications. They are more generally called artificial stones, and their applications partially overlap with the applications of natural stones such as marble or granite. They can be made simulating the colors and patterns in natural stone, or they might also have a totally artificial appearance, e.g. with bright red or fuchsia colors. The basis of their composition and the technology currently used for their manufacture dates back from the late 1970s, as developed by the Italian company Breton SpA, and which is nowadays commercially known in the sector under the name Bretonstone®. The general concepts hereof are described, for example, in the patent U.S. Pat. No. 4,204,820. In this production process, quartz stone granulate, sometimes mixed with synthetic cristobalite and/or other mineral granulates, having varied particle sizes, are firstly mixed with a hardenable binder, normally a liquid organic resin. The resulting mixture is homogenized and distributed into a temporary mold or alternatively onto a sheet of paper, where it is then compacted by vibrocompaction under vacuum and subsequently hardened.

Other combinations of stone granulate filler and binder have been proposed, with varied commercial success. Thus, for example, marble and granite have been tried as granulates for agglomerates together with organic resins, but they resulted in materials with significantly lower performance than quartz surfaces for their use as construction materials and in materials with highly limited possibilities regarding their appearance. Myriad of other mineral and non-mineral granulate fillers have been described, mostly in the patent literature, such as recycled glass, glass frits, glass beads, feldspars, porphyry, amorphous silica, ceramics, dolomite, basalt, carbonates, metal silicon, fly-ash, shells, corundum, silicon carbide, among many others. On the other hand, inorganic binders, such as hydraulic cement, have been used instead of organic resins in commercial agglomerated artificial stone for building applications.

The inorganic filler used in the artificial stone surfaces, and particularly those manufactured by the Bretonstone® process, is usually separated in at least two fractions according to their particle sizes and functions, the first fraction known as grain particles and the second as micronized powders. The grain particles are defined by granulates of larger particle sizes, ranging normally from 0.1 mm-2 mm. The grain particles form the product scaffold and contribute greatly to the mechanical properties of the product. On the other hand, the micronized powders are the granulates with the smaller particle sizes, frequently smaller than 100 micrometers, or even <65 micrometers. The micronized powders fill the interstices among the grain particles, together with the resin. Sometimes, the mix of micronized powders and resin is referred to as "paste". The grain particles and the micronized powders forming the artificial stone surface can be made of the same or different materials.

Quartz stone and synthetic cristobalite, although being different materials, they have several common characteristics that make them ideal fillers, both as grain particles or as micronized powders, for the application in the manufacture of durable construction/decoration surfaces, such as high abundance and availability, hardness, translucency, whiteness and chemical inertness. However, they have at least one serious drawback. The fine fraction of respirable crystalline silica dust generated during the manufacture of the artificial agglomerated stone containing quartz or cristobalite, or when this agglomerated material is mechanically processed, possess an occupational health risk for workers or fabricators. For example, prolonged or repeated inhalation of the small particle size fraction of crystalline silica dust has been associated with pneumoconiosis (silicosis) and other serious diseases. To avoid those types of hazards, workers potentially exposed to high levels of the respirable fraction of crystalline silica dust are required to wear personal protection equipment (e.g., respirators with particle filter), to work under ventilation for efficient air renewal, and to use measures which fight the source of the dust (e.g., processing tools with water supply or dust extraction).

To cope with this shortcoming from the raw material side, abundant natural materials such as feldspar could be proposed as substitute of quartz in quartz surfaces. Indeed, feldspars have been described as suitable fillers in this type of products, for example in EP2011632A2 examples 1 or 2, EP2216305A1 example 2, WO2009068714A1 and WO2007014809A1.

Document WO 2021/069464 discloses artificial agglomerated stone materials comprising a hardened organic resin and feldspar granules as inorganic fillers, in order to reduce the crystalline silica content in the agglomerated stone.

There is an ongoing need for improvements which would further contribute to address any shortcomings found in the art described above or anywhere else.

The present disclosure is based on the finding by the inventors that artificial agglomerated stone can be more efficiently manufactured comprising micronized feldspar, when the micronized feldspar is combined with small amounts of micronized calcium carbonate material.

Document WO 2021/069464 discloses the use of feldspar as inorganic filler in the manufacture of agglomerated stone materials, including its use as micronized powder. The inventors of the present disclosure have now surprisingly found that small amounts of micronized calcium carbonate material can be advantageously used as an additive to, or in combination with, the feldspar micronized powder in the manufacture of artificial agglomerated stone materials or articles. In particular, addition of small amounts of micronized calcium carbonate material to micronized mixtures comprising the feldspar micronized powder has been found to produce mixtures with organic resin showing improved mixability, as a consequence of a significantly reduced viscosity—or higher flowability—compared to the same mixture without calcium carbonate material.

The enhanced mixability of the mixtures comprising micronized feldspar and micronized calcium carbonate material facilitates, e.g., the homogenization during the manufacture of the artificial agglomerated stone. It favors, as well, a more efficient vacuum vibrocompaction. In consequence, the slabs produced are less prone to present visual defects or mechanical faults, maintaining excellent physical performance and appearance, and/or can be manufactured with higher productivities.

Finally, the inventors have also found in certain embodiments the synergistic effect that, in addition to the improved mixability and the other advantages mentioned above, adding small amounts of micronized calcium carbonate material together with the micronized feldspar in the manufacture of artificial agglomerated stone leads to an increase of L* (lightness) value in the colorimetry of the resulting product. Increase of L* means higher whiteness. Therefore, in the case that artificial agglomerated stone of high whiteness is desired, lower amounts of whitening pigments (typically $TiO_2$) will be needed to achieve the desired whiteness when a mixture comprising micronized feldspar and micronized calcium carbonate material is used as micronized inorganic fillers, compared to the use of mixtures comprising majority of micronized feldspar without micronized calcium carbonate material.

Thus, in a first aspect, the present disclosure is concerned with an artificial agglomerated stone comprising:
  a) from 5 wt %-15 wt % of hardened organic resin,
  b) from 70 wt %-90 wt % of inorganic fillers with particle size of 0.1-2 mm, and
  c) from 5 wt %-25 wt % of micronized inorganic fillers with a particle size <100 micrometers, based on the weight of the agglomerated stone;
  wherein the micronized inorganic fillers comprise:
    c') from 50 wt %-98 wt % of feldspar, and
    c") from 2 wt %-30 wt % of calcium carbonate material,
    based on the weight of the micronized inorganic fillers.

In a second aspect, the present disclosure is directed to a process for preparing an artificial agglomerated stone, comprising:
  i) mixing a composition to form an unhardened mixture comprising:
    a) from 5 wt %-15 wt % of hardenable organic resin,
    b) from 70 wt %-90 wt % of inorganic fillers with a particle size of 0.1-2 mm, and
    c) from 5 wt %-25 wt % of micronized inorganic fillers with a particle size <100 micrometers,
    based on the weight of the composition;
    wherein the micronized inorganic fillers comprise:
      c') from 50 wt %-98 wt % of feldspar, and
      c") from 2 wt %-30 wt % of calcium carbonate material,
      based on the weight of the micronized inorganic fillers;
  ii) vacuum vibrocompacting the unhardened mixture obtained in i) to form a compacted mixture, and
  iii) hardening the compacted mixture obtained in ii).

DESCRIPTION

The term "agglomerated stone" or "artificial agglomerated stone" is generally used and understood in the field of the present disclosure. For clarity purposes, but without wanting it to be limiting, the term "agglomerated stone" or "artificial agglomerate stone" refers herein at least to all materials included in the definition contained in European standard EN 14618:2009

As is well known in the art, the term "feldspar" designates a large group of crystalline minerals found in nature, formed by natural processes (e.g., metamorphism, or crystallization in slow-cooled rocks at high earth depths or from magma), and found in rocks. They are composed of monoclinic and triclinic silicates of aluminum with alkali or alkaline earth metals, commonly potassium, sodium, and calcium. Minerals in the feldspar group fit the formula: $X(Al,Si)_4O_8$, wherein X can be alkali or alkaline earth metal such as K, Na, Ca, Ba, Rb and Sr, generally Na, K and Ca. Examples of minerals coming within the term feldspar include plagioclase feldspars and alkali feldspars, such as andesine, albite, anorthoclase, anorthite, labradorite, microcline, orthoclase, oligoclase, sanidine and bytownite.

The calcium carbonate material is understood as a natural, mineral, processed, and/or synthetic material comprising predominantly calcium carbonate ($CaCO_3$), or a calcium carbonate content of at least 80 wt. %, for example at least 90 wt. %, related to the weight of the calcium carbonate material. Further for example, the $CaCO_3$ content of the calcium carbonate material is at least 95 wt. %, related to the weight of the calcium carbonate material. The $CaCO_3$ content may be determined by well-known analytical methods, e.g., Bernard calcimeter, or by inductively coupled plasma (ICP) optionally coupled with mass spectrometry. Minerals and rocks inside the scope of calcium carbonate material can be those selected from chalk, limestone, calcite, aragonite, vaterite, marble, travertine and/or mixtures thereof. Other acceptable natural calcium carbonate materials may be obtained from biological sources (e.g., eggshells, snail shells, seashells). Precipitated calcium carbonate (PCC) produced by recarbonization processes is an example of a suitable synthetic calcium carbonate material.

The terms "hardened organic resin" and "hardenable organic resin" are well known in the art. According to some embodiments, organic resin or hardenable organic resin shall both be understood as a material of predominantly organic nature formed by a compound or a mixture of compounds, optionally together with a solvent. The compound or the compounds in the mixture of compounds in the resin might be monomeric, oligomeric, or polymeric, optionally with variable molecular weights and crosslinking degrees. At least some of the compounds in the hardenable organic resin, and optionally also the solvent, will have functional reactive groups capable of undergoing curing by a crosslinking or curing reaction which hardens the organic resin, resulting in a hardened organic resin (or hardened binder) when the curing is concluded.

The "particle size," also called "particle diameter," can be measured, for instance, by known screening separation using sieves of different mesh size. The term "particle size" as used herein, means the range in which the diameter of the individual particles falls. It can be measured by particle retention or passage on calibrated sieves that have measured mesh size openings, where a particle will either pass through (and therefore be smaller than) or be retained by (and therefore larger than) a certain sieve whose size openings are measured and known. Particle sizes are defined to be within a certain size range determined by a particle's ability to pass through one sieve with larger mesh openings or "holes" and not pass through a second sieve with smaller mesh openings. In the instances along this description where an inorganic filler is said to have a particle size in a given range, it is meant that less than 1% of particles, from of the total particle population for this filler, have a particle size outside the given range. In an embodiment, less than 0.5% of particles, from of the total particle population for this filler, have a particle size outside the given range. In a further embodiment, less than 0.1% of particles, from of the total particle population for this filler, have a particle size outside the given range. For particles with a particle size <100 micrometers, the particle size distribution of a sample can be measured for example by laser diffraction, specifically with known commercial equipment (e.g., Malvern Panalytical Mastersizer 3000 provided with a Hydro cell). For the measurement, the sample might be dispersed in demineralized water assisted by an ultrasound probe. The laser diffractometer provides particle distribution curves (volume of particles vs. particle size) and the D10, D50 and D90 statistical values of the particle population of the sample (particle size values where 10% (D10), 50% (D50) or 90% (D90) of the sample particle population lies below this value, respectively).

In some embodiments, the desired particle size ranges (granulometry) of the inorganic fillers can be obtained by grinding and sieving, by methods known in the art, such as grinding with ball mills or opposed grinding rollers.

The composition of the inorganic fillers might be obtained by X-ray fluorescence (XRF), a technique well-established in the mineral technological field. The composition indicated herein corresponds preferably to the average, calculated from at least 3 repetitions of the measure, of the composition of samples containing a mass of filler material (e.g., 1 gram of filler material).

The skilled person readily understands that, when a composition or material is defined by the weight percentage values of all the components it comprises, these values can never sum up to a value which is greater than 100%. The amount of all components that the material or composition comprises adds up to 100% of the weight of the composition or material.

In a first aspect, the present disclosure is directed to an artificial agglomerated stone comprising:
a) from 5 wt %-15 wt % of hardened organic resin,
b) from 70 wt %-90 wt % of inorganic fillers with a particle size of 0.1-2 mm, and
c) from 5 wt %-25 wt % of micronized inorganic fillers with a particle size <100 micrometers,
based on the weight of the agglomerated stone;
wherein the micronized inorganic fillers comprise:
c') from 50 wt %-98 wt % of feldspar, and
c") from 2 wt %-30 wt % of calcium carbonate material,
based on the weight of the micronized inorganic fillers.

In some embodiments, the calcium carbonate material herein is, for example, a material having a CaCO$_3$ content of 80-100 wt. %, or 90-100 wt. %, or such as 95-100 wt. %. Therefore, the micronized calcium carbonate material used in the present disclosure, although of high purity, can comprise small amounts of accessory minerals or impurities mixed with the predominant CaCO$_3$.

Alternatively, or additionally, to the embodiments herein, the calcium carbonate material is, for example, a mineral or rock selected from chalk, limestone, calcite, aragonite vaterite, marble, travertine and/or mixtures thereof, or a mineral or rock selected from calcite, limestone, marble and/or mixtures thereof.

In some embodiments, micronized inorganic fillers have a particle size higher than 0.1 micrometers and lower than 100 micrometers, such as a particle size between 0.1 micrometers and 99 micrometers, for example between 0.2 micrometers and 99 micrometers.

In some embodiments, the micronized inorganic fillers can comprise from 60 wt %-98 wt % of feldspar, such as 70 wt %-98 wt % of feldspar, based on the weight of the micronized inorganic fillers. In a further embodiment, the micronized inorganic fillers comprise from 75 wt %-98 wt % of feldspar; further for example, 80 wt %-95 wt % of feldspar, based on the weight of the micronized inorganic fillers.

In some embodiments, the micronized inorganic fillers comprise 2 wt %-25 wt % of calcium carbonate material, such as 5 wt %-20 wt % of calcium carbonate material; for example 7 wt %-20 wt % of calcium carbonate material, based on the weight of the micronized inorganic fillers.

In an embodiment, the micronized inorganic fillers comprise:
c') from 70 wt %-98 wt % of feldspar, and
c") from 2 wt %-30 wt % of a calcium carbonate material, based on the weight of the micronized inorganic fillers.

In an embodiment, the micronized inorganic fillers comprise:
c') from 70 wt %-95 wt % of feldspar, and
c") from 5 wt %-30 wt % of a calcium carbonate material, based on the weight of the micronized inorganic fillers.

In a further embodiment, the micronized inorganic fillers comprise:
c') from 75 wt %-98 wt % of feldspar, and
c") from 2 wt %-25 wt % of a calcium carbonate material, based on the weight of the micronized inorganic fillers.

In another embodiment, the micronized inorganic fillers comprise:
c') from 80 wt %-95 wt % of feldspar, and
c") from 5 wt %-20 wt % of a calcium carbonate material, based on the weight of the micronized inorganic fillers.

The micronized feldspar has a particle size <100 micrometers. In an embodiment, the micronized feldspar has a particle size <75 micrometers, for example, <65 micrometers, such as 0.1 micrometers-74 micrometers or 0.5 micrometer –64 micrometers.

In some embodiments, the micronized feldspar has a particle size D90 <50 micrometers, such as <40 micrometers, and further for example, D90 between 2-40 micrometers.

The micronized calcium carbonate material has a particle size <100 micrometers. In an embodiment, the micronized calcium carbonate material has a particle size <30 micrometers, for example <25 micrometers, such as 0.1 micrometer –29 micrometers or 0.2 micrometer –24 micrometers.

In some embodiments, the micronized calcium carbonate material has a particle size D90 <30 micrometers, such as <20 micrometers, and for example, D90 between 0.2 micrometer –20 micrometers.

In an embodiment, the micronized inorganic fillers comprise:
c') from 70 wt %-98 wt %, such as 75-95 wt %, of feldspar with a particle size <75 micrometers, and
c") from 2 wt %-30 wt %, such as 5-25 wt %, of a calcium carbonate material with a particle size <30 micrometers,
based on the weight of the micronized inorganic fillers.

In an embodiment, the micronized inorganic fillers comprise:
c') from 70 wt %-98 wt %, such as 75-95 wt %, of feldspar with a particle size D90 <50 micrometers, and c''') from 2 wt %-30 wt %, such as 2 wt %-25 wt %, of a calcium carbonate material with a particle size D90 <20 micrometers, based on the weight of the micronized inorganic fillers.

In some embodiments, the micronized feldspar is sodium feldspar ($NaAlSi_3O_8$), such as albite.

According to an embodiment, the micronized feldspar comprises from 60 wt %-73 wt % of $SiO_2$, from 17 wt %-22 wt % of $Al_2O_3$ and from 8 wt %-12 wt % of $Na_2O$, based on the weight of the feldspar. In some embodiments, the micronized feldspar further comprises from 0-0.5 wt. % of $Fe_2O_3+TiO_2$.

In an embodiment, the micronized feldspar is characterized by a composition which comprises oxides according to the following ranges in weight percent, based on the weight of the feldspar:

| | |
|---|---|
| $SiO_2$ | from 64 wt %-71 wt. % |
| $Al_2O_3$ | from 17 wt %-21 wt. % |
| $Na_2O$ | from 9 wt %-12 wt. % |
| $K_2O$ | from 0 wt %-2 wt. % |
| $Fe_2O_3 + TiO_2$ | from 0 wt %-0.3 wt. % |

In a further embodiment, it comprises:

| | |
|---|---|
| $SiO_2$ | from 65 wt %-70.5 wt. % |
| $Al_2O_3$ | from 17.5 wt %-20 wt. % |
| $Na_2O$ | from 9.3 wt %-11.9 wt. % |
| $K_2O$ | from 0 wt %-1 wt. % |
| $Fe_2O_3 + TiO_2$ | from 0 wt %-0.1 wt. % |

In some embodiments, the micronized feldspar comprises from 64 wt %-71 wt. % of $SiO_2$ based on the weight of the feldspar. In some embodiments, from 65 wt %-70.5 wt. % of $SiO_2$.

In some embodiments, the micronized feldspar comprises from 17 wt %-21 wt. % of $Al_2O_3$ based on the weight of the feldspar. In some embodiments, from 17.5 wt %-20 wt. % of $Al_2O_3$.

In some embodiments, the micronized feldspar comprises from 9 wt %-12 wt. % of $Na_2O$ based on the weight of the feldspar. In some embodiments, from 9.3 wt %-11.9 wt. % of $Na_2O$.

In some embodiments, the micronized feldspar comprises from 0 wt %-2 wt. % of $K_2O$, such as from 0 wt %-1 wt. %, based on the weight of the feldspar. In some embodiments, from 0.01 wt %-2 wt. % or from 0.01 wt %-1 wt. % of $K_2O$.

In some embodiments, the micronized feldspar comprises from 0 wt %-0.2 wt. % of $Fe_2O_3$, such as from 0 wt %-0.1 wt. %, based on the weight of the feldspar.

In an embodiment, the micronized feldspar comprises from 0.01 wt %-0.3 wt. % or from 0.01 wt %-0.1 wt. % of $Fe_2O_3+TiO_2$, based on the weight of the feldspar.

When the amount of a component of the composition is given by a range with a lower limit of 0 or 0.0 wt %, this means that the composition may either not comprise the component or comprise it in an amount not higher than the specified upper limit.

The sum of the weight percentages of $SiO_2$, $Al_2O_3$ and $Na_2O$ in the micronized feldspar is, for example, at least 85 wt. %, or at least 90 wt. %, or even at least 93 wt. %, based on the weight of the feldspar. In some embodiments, the sum is in the range 85 wt %-99.8 wt. %, such as 90-99.5 wt. %, or 93-99.5 wt. %, based on the weight of the feldspar.

In some embodiments, the micronized feldspar may further comprise CaO in the composition. In a particular embodiment, it comprises from 0 wt %-6 wt. % of CaO, such as 0 wt %-3 wt. %, for example, from 0 wt %-3 wt. %, based on the weight of the feldspar. In some embodiments, from 0.01 wt %-6 wt. % or from 0.05 wt %-3 wt. % of CaO.

In an embodiment, the micronized feldspar may comprise from 0 wt %-0.5 wt. % of water, such as 0 wt %-0.1 wt. %, based on the weight of the feldspar. In a further embodiment, it comprises from 0.01 wt %-0.5 wt. % or from 0.01 wt %-0.1 wt. % of water based on the weight of the feldspar.

According to an embodiment, the micronized feldspar comprises:

| | |
|---|---|
| $SiO_2$ | from 64 wt %-71 wt. % |
| $Al_2O_3$ | from 17 wt %-21 wt. % |
| $Na_2O$ | from 9 wt %-12 wt. % |
| CaO | from 0 wt %-6 wt. % |
| $K_2O$ | from 0 wt %-2 wt. % |
| $Fe_2O_3 + TiO_2$ | from 0 wt %-0.3 wt. % |

In a further embodiment, it comprises:

| | |
|---|---|
| $SiO_2$ | from 65 wt %-70.5 wt. % |
| $Al_2O_3$ | from 17.5 wt %-20 wt. % |
| $Na_2O$ | from 9.3 wt %-11.9 wt. % |
| CaO | from 0 wt %-3 wt. % |
| $K_2O$ | from 0 wt %-1 wt. % |
| $Fe_2O_3 + TiO_2$ | from 0 wt %-0.1 wt. % |

The micronized feldspar may comprise silica in crystalline form (e.g., as quartz or cristobalite). However, in some embodiments, the crystalline silica concentration in the micronized feldspar is ≤10 wt. %, or ≤8 wt. %, or even ≤5 wt. %, based on the weight of the feldspar. In an embodiment, the crystalline silica concentration in the micronized feldspar ranges from 0 wt %-10 wt. %, or from 0 wt %-8 wt. %, or even from 0 wt %-5 wt. %, based on the weight of the feldspar. In an embodiment, it is in the range from 0.1 wt %-10 wt. %, or from 0.1 wt %-8 wt. %, or even from 0.5 wt %-5 wt. %, based on the weight of the feldspar.

The total content of crystalline phases in the micronized feldspar is, e.g., in the range from 80 wt %-99 wt. %, or even from 81 wt %-97 wt. % of the weight of the feldspar, the rest being amorphous phase. In some embodiments of the present disclosure, the amount of the albite ($NaAlSi_3O_8$) crystalline phase in the micronized feldspar is from 80 wt %-97 wt. %, or even from 81 wt %-95 wt. % of the weight of the micronized feldspar.

The amount of crystalline silica and other crystalline phases in the micronized feldspar can be determined by powder X-Ray Diffraction analysis (XRD) using the Rietveld method combined with the use of an internal standard for quantification, a technique amply used in the field.

In an embodiment, the micronized calcium carbonate material may be in the form of micronized marble comprising at least 95 wt % of $CaCO_3$ in its composition.

In some embodiments, the calcium carbonate material comprises other compounds in addition to $CaCO_3$, as may be determined for example by ICP (Inductively Coupled Plasma). Thus, the calcium carbonate material comprises $MgCO_3$, such as in a concentration ranging from 0 wt %-5 wt %, or from 0 wt %-3 wt %, related to the weight of the calcium carbonate material. In some embodiments, the calcium carbonate material comprises $Al_2O_3$, such as in a concentration ranging from 0 wt %-5 wt %, or from 0 wt %-1 wt %. In some embodiments, the calcium carbonate material comprises $Fe_2O_3$, such as in a concentration ranging from 0 wt %-0.2 wt %, for example, from 0 wt %-0.1 wt %.

In an embodiment, the micronized calcium carbonate material comprises from 0 wt %-0.5 wt % of water, such as 0 wt %-0.1 wt %, based on the weight of the calcium carbonate material. In a further embodiment, it comprises from 0.01 wt %-0.5 wt % or from 0.01 wt %-0.1 wt. % of water based on the weight of the calcium carbonate material.

According to an embodiment, the artificial agglomerated stone comprises from 10 wt %-25 wt % of micronized inorganic fillers with particle size <100 micrometers based on the total weight of the artificial agglomerated stone. In a further embodiment, it comprises from 15 wt %-25 wt % of the micronized inorganic fillers.

In some embodiments, the weight ratio of micronized feldspar to micronized calcium carbonate material is from 75:25 to 97:3; such as from 80:20 to 95:5; further for example, from 80:20 to 92:8.

In some embodiments, the micronized inorganic fillers or powders can comprise other inorganic materials with particle size <100 micrometers different from feldspar and calcium carbonate material. In an embodiment, the micronized inorganic fillers can further comprise from 0 wt %-20 wt %, such as 0 wt %-10 wt %, of other inorganic fillers with particle size <100 micrometers different from feldspar and calcium carbonate material. The other inorganic materials can be selected from stone, stone-like materials, and ceramic materials, such as quartz, silicate glass, silicate frit, silica sand, feldspathic sand, mirror, granite, basalt, cristobalite, dolomite, ceramic, and mixtures thereof; or quartz, silicate glass, frit, silica sand, feldspathic sand, cristobalite, and mixtures thereof. In some embodiments, the micronized inorganic fillers with particle size <100 micrometers different from feldspar and calcium carbonate material comprise from 0 wt %-5 wt %, or from 0 wt %-1 wt % of inorganic granulates with a content of crystalline silica >15 wt %, or >10 wt %.

In additional or alternative embodiments, for example, the micronized inorganic fillers with particle size <100 micrometers different from feldspar and calcium carbonate material are selected from silicate glass granulates, silicate glass granulates, silicate frit granulates, synthetic silicate granulates, ceramic granulates, or mixtures thereof. Synthetic silicate granulates according to these embodiments can be those described in WO 2021019020 A1 or WO 2021018996 A1.

In some embodiments, the artificial agglomerated stone of the present disclosure comprises from 70 wt %-90 wt % of inorganic fillers with a particle size of 0.1 mm-2 mm, such as of 0.1 mm-1.5 mm, based on the total weight of the artificial agglomerated stone. In some embodiments, it comprises from 80 wt %-90 wt % of the inorganic fillers.

The inorganic fillers with a particle size of 0.1 mm-2 mm, such as of 0.1 mm-1.5 mm, can be stone, stone-like or ceramic materials, such as quartz, feldspar, silicate glass, silicate frit, silica sand, feldspathic sand, mirror, granite, basalt, cristobalite, dolomite, marble, ceramic, and mixtures thereof.

In some embodiments, an artificial agglomerated stone is with low crystalline silica content. For example, it is with that at least 50 wt %, such as at least 75 wt %, at least 90 wt %, further for example, at least 95 wt. % of all the inorganic fillers (including micronized inorganic fillers and inorganic fillers with particle size of 0.1-2 mm) have a low crystalline silica content, such as a crystalline silica (quartz, cristobalite or other crystalline polymorphs) content of from 0 wt %-30 wt %, or from 0 wt %-20 wt %, or from 0 wt %-10 wt % relative to the weight of the inorganic fillers. In some embodiments, at least 75 wt %, such as at least 90 wt %, of the other inorganic fillers in the artificial agglomerated stone have a crystalline silica content of from 0 wt %-10 wt % relative to the weight of the inorganic fillers.

In some embodiments, the artificial agglomerated stone does not comprise >25 wt %, or even >10 wt %, relative to the weight of the agglomerated stone, of inorganic fillers (including micronized inorganic fillers and inorganic fillers with particle size of 0.1-2 mm) with a crystalline silica content of >30 wt %, or >20 wt % relative to the weight of the inorganic fillers.

In some embodiments, the artificial agglomerated stone comprises at most from 0 wt %-20 wt %, such as at most 0 wt %-5 wt %, relative to the weight of the agglomerated stone, of inorganic fillers (including micronized inorganic fillers and inorganic fillers with particle size of 0.1 mm-2 mm) with a content of crystalline silica of from 30 wt %-100 wt % relative to the weight of the inorganic fillers.

In some embodiments of the present disclosure, the artificial agglomerated stone does not comprise inorganic fillers with a content of crystalline silica >30 wt %, or >15 wt %, based on the weight of the inorganic fillers.

In some embodiments, the crystalline silica content of the artificial agglomerated stone may be ≤50 wt %, or ≤40 wt %, or ≤25 wt %, or even ≤0 wt % relative to the weight of the agglomerated stone. In some embodiments, the crystalline silica content of the artificial agglomerated stone may be 0-50 wt %, or 0-25 wt %, or even 0-10 wt %, relative to the weight of the agglomerated stone.

In some embodiments, the artificial agglomerated stone comprises at least 10 wt % of feldspar, preferably at least 25 wt %, more preferably at least 50 wt % of feldspar (including micronized and non-micronized feldspar), based on the weight of the agglomerated stone. In an embodiment, the artificial agglomerated stone comprises 10-90 wt % of feldspar, preferably 20-90 wt %, more preferably 40-90 wt % of feldspar (including micronized and non-micronized feldspar), based on the weight of the agglomerated stone.

In some embodiments, the total amount of micronized inorganic fillers with particle size <100 micrometers plus inorganic fillers with particle size of 0.1 mm-2 mm is from 85 wt %-95 wt %, such as from 90 wt %-95 wt %, based on the total weight of the agglomerated stone.

In some embodiments, the artificial agglomerated stone of the present disclosure comprises from 5 wt %-15 wt % of an organic resin, based on the total weight of the agglomerated stone. In some embodiments, the amount of organic resin is from 5 wt %-12 wt %, based on the weight of the agglomerated stone.

In some embodiments, the hardened (reacted or polymerized) organic resin is, for example, a hardened organic thermosetting resin, suitably liquid when not hardened, and may be selected from unsaturated polyester resins, acrylate and methacrylate-based resins, vinyl resins and epoxy resins. Further for example, the hardenable organic resins are reactive and can be hardened in a curing (or cross-linking) reaction.

In a preferred embodiment, the organic resin is an unsaturated polyester resin.

In some embodiments, the unsaturated polyester resin can be obtained by polymerization of unsaturated dicarboxylic acids (or anhydrides) with diols. For example, by the condensation of an acid or anhydride such as maleic acid or anhydride, fumaric acid, (ortho)phthalic acid or anhydride, isophthalic acid, terephthalic acid, adipic acid, succinic acid or anhydride, sebacic acid, or mixtures thereof, with a diol such as ethylene glycol, diethylene glycol, propylene glycol, butylene glycol, neopentyl glycol, hydrogenated bisphenol A, or mixtures thereof. The unsaturated polyester resin can also comprise an ethylenically unsaturated monomer, such as styrene, for example in an amount of from 25 wt %-45 wt %, based on the weight of the resin.

In some embodiments, the unsaturated polyester resin is obtained by polymerization of a mixture comprising maleic acid or anhydride, (ortho)phthalic acid or anhydride and propylene glycol.

In some embodiments, the unsaturated polyester resin comprises an unsaturated polyester pre-polymer comprising the following monomeric units: from 20 wt %-35 wt % of (ortho)phthalic anhydride, isophthalic acid, or mixtures thereof; from 5 wt %-20 wt % of maleic anhydride, fumaric acid, or mixtures thereof; from 10 wt %-25 wt % of propylene glycol; from 0 wt %-15 wt % ethylene glycol; and from 0 wt %-15 wt % of diethylene glycol; diluted in from 25 wt %-45 wt % of styrene, based on the weight of the unsaturated polyester pre-polymer.

In some embodiments, the artificial agglomerated stone can also comprise additives, such as colorants or pigments, accelerators or catalyzers for the curing or hardening of the resin, promoters for the adhesion between the filler and the resin (e.g. silanes), antimicrobial agents, ultraviolet stabilizers, or mixtures thereof. These types of additives and the proportion thereof are known in the state of the art. For example, these additives may be present in the agglomerated stone in an amount of from 0.01 wt %-5 wt %, based on the weight of the agglomerated stone.

In some embodiments, the artificial agglomerated stone article has an apparent density in the range from 2000 kg/m$^3$-2600 kg/m$^3$, or from 2100 kg/m$^3$-2500 kg/m$^3$. Apparent density can be measured according to EN 14617-1:2013-08.

In some embodiments, the artificial agglomerated stone may be in the form of a block, slab, tile, sheet, board or plate. In an embodiment, the dimensions of the agglomerated stone are at least 1500 mm in length, at least 1000 mm in width and 4 mm-40 mm in thickness; such as 2000 mm-3500 mm in length, 1000 mm-1800 mm in width and 4 mm-40 mm in thickness.

The artificial agglomerated stone material might be used for construction or decoration, for manufacturing counters, kitchen countertops, sinks, shower trays, wall or floor coverings, stairs or similar.

In some embodiments, the artificial agglomerated stone of the present disclosure can be obtained by a process comprising:
i) mixing a composition to obtain an unhardened composition comprising:
   a) from 5 wt %-15 wt % of hardenable organic resin,
   b) from 70 wt %-90 wt % of inorganic fillers with a particle size of 0.1-2 mm, and
   c) from 5 wt %-25 wt % of micronized inorganic fillers with a particle size <100 micrometers,
   based on the weight of the composition;
   wherein the micronized inorganic fillers comprise:
      c') from 50 wt %-98 wt % of feldspar, and
      c") from 2 wt %-30 wt % a calcium carbonate material,
      based on the weight of the micronized inorganic fillers;
ii) vacuum vibrocompacting the unhardened mixture obtained in i) to obtain a compacted mixture, and
iii) hardening the compacted mixture obtained in ii).

Suitable embodiments for the artificial agglomerated stone, organic resin, inorganic fillers with a particle size of 0.1 mm-2 mm, micronized inorganic fillers, feldspar and calcium carbonate material are as defined herein in relation to the artificial agglomerated stone of the present disclosure.

For the manufacture of the artificial agglomerated stone, the hardenable organic resin, such as a liquid organic resin, is mixed with the inorganic fillers (micronized and non-micronized organic fillers) forming an unhardened agglomerated mixture.

In some embodiments, the micronized feldspar and calcium carbonate material are mixed to reach a homogeneous solid mixture in a step prior to mixing with the resin.

The mixing can be achieved, for example, by stirring with the use of conventional mixers, in a manner known in the art. The hardenable organic resin might be one which, once hardened, serves to achieve cohesion and adherence between the inorganic fillers in the produced article or material. The organic resin is preferably thermosetting, liquid and can be selected, for example, from unsaturated polyester resins, acrylate-base resins, methacrylate-based resins, vinyl resins and epoxy resins. These resins are preferably reactive and harden in a curing or cross-linking reaction.

The hardening of the organic resin, and thus of the mixture after compaction, can ultimately be accelerated by raising the temperature, depending on the organic resin used, and/or by using suitable catalysts and accelerators as known in the art.

Additionally, additives, such as colorants or pigments, curing catalysts, curing accelerators, adhesion promoters (e.g. silanes), antimicrobial agents, ultraviolet stabilizers or mixtures thereof, can be included in the composition of step i). These types of additives and the proportion used thereof are known in the state of the art. In some embodiments, these additives may be present in the composition in step i) in an amount of from 0.01 wt %-5 wt. %, based on the weight of the composition.

The inorganic fillers (micronized and non-micronized inorganic fillers) may be incorporated to the agglomerated mixture with different particle sizes and can be obtained from the crushing and/or grinding of natural or artificial materials. These inorganic fillers can be sourced, for example, from specialized companies, which commercialize them already dry and classified according to their particle size.

The unhardened agglomerated mixture obtained in step i) may be then transported to a distributor device. Distributors suitable are known, such as those used for the distribution of the (unhardened) agglomerated mixtures in the manufacture of quartz agglomerated surfaces. This distributor device is, for example, movable along the length of a temporary mold or supporting sheet. The supporting sheet, in its simplest form, might be embodied by a kraft paper or plastic sheet. Alternatively, it might be a more complex elastomeric mold tray. The distributor device, for example, consists of a feeding hopper that receives the mixture in the top opening thereof and a conveyor belt positioned below the bottom outlet opening of the hopper, which collects or extracts the mixture from the hopper and deposits it onto or into the mold or supporting sheet. Other distributor devices are possible within the general concept of the present disclosure.

The unhardened agglomerated mixture having been distributed in the mold or onto the supporting sheet is, for example, covered with a protective sheet on its top surface and subjected to vacuum vibrocompaction. For this, in an example, the mixture is transported inside a compaction area of a press, wherein it is inserted in a sealable chamber. Then, the chamber is sealed, and vacuum is created with appropriate gas evacuation pumps. Once the desired vacuum level has been reached (e.g., 5 mbar-40 mbar), the ram of the press exerts a compaction pressure simultaneously with the application of vertical vibration of the piston (e.g., oscillating at 2.000 Hz-4.000 Hz). During the vacuum vibrocompaction, the air entrapped in the agglomerated mixture is substantially evacuated.

The compacted mixture then goes to a hardening or curing stage. In this stage, depending on the type of resin, as well as the use or not of any suitable catalysts or accelerants, the mixture is suitably subjected to the effect of temperature in a curing oven, suitably heated at a temperature between 80° C.-120° C., with residence times in the oven generally varying from 20 minutes to 60 minutes. After curing, the hardened compacted mixture is cooled down to a temperature equal to or less than 40° C.

After hardening, the artificial agglomerated stone obtained, which can be shaped as blocks, slabs, boards, plates, tiles or sheets, can be cut and/or calibrated to the desired final dimensions, and may be finished (polished, honed, etc.) on one or both of its larger surfaces, depending on the intended application.

In a further aspect, the present disclosure is directed to an artificial agglomerated stone obtainable by a process as defined above, comprising:
  i) mixing a composition to obtain an unhardened composition comprising:
    a) from 5 wt %-15 wt % of hardenable organic resin,
    b) from 70 wt %-90 wt % of inorganic fillers with a particle size of 0.1 mm-2 mm, and
    c) from 5 wt %-25 wt % of micronized inorganic fillers with a particle size <100 micrometers,
    based on the weight of the composition;
    wherein the micronized inorganic fillers comprise:
      c') from 50 wt %-98 wt % of feldspar, and
      c") from 2 wt %-30 wt % of a calcium carbonate material,
      based on the weight of the micronized inorganic fillers;
  ii) vacuum vibrocompacting the unhardened composition obtained in i) to generate a compacted mixture, and
  iii) hardening the compacted mixture obtained in ii).

It should be understood that the scope of the present disclosure includes all the possible combinations of embodiments disclosed herein.

EXAMPLES

Testing Methods:

XRF: Oxide and elemental analysis might be conducted by X-Ray Fluorescence in a commercial XRF spectrometer. For example, a disc of about 1 g of a sample is mixed with lithium tetraborate and calcined in air atmosphere at a temperature of 1.050° C. for 25 minutes prior to analysis in the spectrometer. The results are reported as relative weight percentage of oxides ($SiO_2$, $Al_2O_3$, etc.), together with the weight 'lost on ignition' during calcination (evaporation/desorption of volatiles, decomposition of organic matter). The spectrometer is previously calibrated with multipoint calibration curves of known concentration of standards. The international standard ISO 12677:2011 may be followed for XRF analysis.

XRD: As way of example, the identification and quantification of crystalline phases can be done by powder X-Ray Diffraction (XRD) and the Rietveld method, combined with the use of an internal standard. This method allows to quantify the overall amorphous phase as well. The internal standard methodology requires a known amount of reference standard (corundum, for example) to be thoroughly mixed and homogenized with each sample to be analyzed, optionally employing a small amount of isopropanol or other mixing/homogenizing adjuvant. A Ge(111) monochromator generating $CuK\alpha_1$ radiation and a X'Celerator detector of a commercial equipment (e.g. PANalytical X'Pert Pro automated diffractometer) may be used. X-Ray diffraction patterns of powder may be recorded between 4°-70° in 2θ at 60 s/step, while rotated to increase particle statistics distribution. Once the X-ray powder diffraction data is obtained, a software (e.g. DIFFRAC.EVA by Brucker) can be used to carry out the identification of the crystalline phases by comparison with catalogued diffraction patterns. The quantification by the crystalline and amorphous phases may be conducted with Rietveld refinement method, e.g. by using the TOPAS software (by Coelho Software). The content of crystalline phases and overall amorphous phase is calculated as weight percentage of the sample analyzed, after subtracting the amount of the internal standard used.

Granulometry: The particle size, also called particle diameter, can be measured by known screening separation using sieves of different mesh size. For particles with a particle size <200 micrometers, the particle size distribution can be measured by laser diffraction with a commercial equipment (e.g. Malvern Panalytical Mastersizer 3000 provided with a Hydro cell). For the measurement the sample might be dispersed in demineralized water assisted by an ultrasound probe. The laser diffractometer provides particle distribution curves (volume of particles vs. particle size) and the D10, D50 and D90 statistical values of the particle population (particle size values where 10%, 50% or 90% of the sample particle population lies below this value, respectively).

The colorimetry of hardened mixtures of micronized powder and unsaturated polyester resin (UPR resin) is determined as follows: 50 g of activated UPR resin (UPR resin+0.125 wt % cobalt accelerator) and 50 g of micronized powder are mixed until homogenization, before 0.75 g of peroxide catalyst is added under stirring at room temperature. The mixture is then poured into a mold and hardened for 30 minutes in a convection oven set at 70° C. The colorimetry of the hardened mixtures is measured, after separating from the mold, on the surface that was facing down during hardening, with a CM-3600d spectrophotometer from Konica Minolta. The result averaged from three measurements is given as coordinates L*, a* and b* in the CIE Lab color space.

Resin absorption of the micronized powders is evaluated as follows: 25 g of the powder is placed in container under a graduated burette filled with a commercial UPR resin of accurately known density. Small amounts of resin are slowly added to the powder mixtures, incorporating it into the powder by rubbing and mixing with a spatula and/or pistil, until exactly enough resin has been added to reach the consistency of a stiff, putty-like paste that does not break or segregate when handled. At this point, called the saturation point, the paste can be formed to a ball by rubbing it between protected fingers, without appearance cracks, and presenting a matt solid surface (this is, without being glossy or soft to the touch). The volume of resin used to reach the saturation point is annotated, and the value of resin absorbed reported as the grams of resin absorbed by 100 g micronized powder.

Materials:

Three different high purity commercial calcium carbonate materials were used, C1, C2 from the same supplier, and C3 from a different supplier. All materials had a humidity <0.1 wt % according to ISO 787/2.

C1 and C2 are micronized calcium carbonates from white marble, with a $CaCO_3$ content of 97.5 wt %, $MgCO_3$ of 2.2 wt %, 0.1 wt % of $Fe_2O_3$, and <0.1 wt % $Al_2O_3$, as determined by I.C.P. C3 is a micronized calcium carbonate from white marble, with a $CaCO_3$ content of 98.8 wt %, $MgCO_3$ of 0.9 wt %, 0.06 wt. % of $Al_2O_3$ and 0.1 wt % of $Fe_2O_3$, as determined by I.C.P.

Feldspar (FD) is a micronized sodium feldspar having a composition comprising 68.4 wt % $SiO_2$, 18.6 wt % $Al_2O_3$, 10.6 wt % $Na_2O$, 0.2 wt % $K_2O$, 0.02 wt % $TiO_2$ and 0.01 wt % $Fe_2O_3$. The crystalline phases in this sodium feldspar are about 83 wt % albite, and 7 wt % quartz.

The particle size distribution of C1, C2 and C3, as well as of FD, was as shown in Table 1:

TABLE 1

|  | C1 (micrometers) | C2 (micrometers) | C3 (micrometers) | FD (micrometers) |
| --- | --- | --- | --- | --- |
| D10 | 0.88 | 0.86 | 0.36 | 3.4 |
| D50 | 2.21 | 2.1 | 2 | 11.1 |
| D90 | 4.74 | 9.4 | 12.0 | 26.8 |

In comparison with C2 and C3, C1 has a narrower particle size distribution, with D90 under 5 microns, while C2 and C3 distribution is broader with D90 close or over 10 microns.

UPR resin 1, UPR resin 2, UPR resin 3 and UPR resin 4 are different commercial resins of unsaturated polyester prepolymer diluted in ca. 35% styrene.

Experiments:

Micronized powder having different amounts of feldspar and calcium carbonate material were mixed with commercial liquid UPR resin 1. The amounts of each material in each example are shown in the following Table 2:

TABLE 2

| Example number | Resin (g) | C1 (g) | C2 (g) | FD (g) |
| --- | --- | --- | --- | --- |
| 1 (comparative) | 200 | — | — | — |
| 2 | 100 | 5 | — | 95 |
| 3 | 100 | 10 | — | 90 |
| 4 | 100 | — | 5 | 95 |
| 5 | 100 | — | 10 | 90 |
| 6 (comparative) | 100 | — | — | 100 |

The mixtures were thoroughly mixed with a mechanical stirrer until homogenization. Right after, the viscosity was measured at 25° C. with a laboratory Brookfield viscosimeter working in the 10%-90% torque range. The viscosity of the mixtures for Examples 1-6 is depicted in Table 3.

TABLE 3

| Example number | Viscosity (cP) |
| --- | --- |
| 1 (comparative) | 2380 |
| 2 | 9980 |
| 3 | 7200 |
| 4 | 9880 |
| 5 | 7340 |
| 6 (comparative) | 11060 |

Put in a highly simplified way, a mixture with a low viscosity (cP) will flow and move easily and fast under effect of a force (or in other words, it will present a low resistance to flow), whereas a high viscosity (cP) indicates that the mixture is going to flow or move slower under the same force (higher resistance to flow). From the values presented in Table 3, it can be seen how the mixtures of Examples 2-5 combining small amounts of C1 or C2 with FD, present in all cases a significantly reduced viscosity when compared with the mixture without any calcium carbonate material (Example 6).

In another series of experiments, micronized powder comprising different amounts of C1 and FD, and a commercial UPR resin 2, were thoroughly mixed and their viscosity measured as above. The amounts of each material in these examples and the corresponding viscosities are shown in Table 4.

TABLE 4

| Example number | Resin (g) | C1 (g) | FD (g) | Viscosity (cP) |
| --- | --- | --- | --- | --- |
| 7 (comparative) | 100 | — | — | 900 |
| 8 | 100 | 20 | 80 | 6300 |
| 9 | 100 | 18 | 82 | 6870 |
| 10 | 100 | 15 | 85 | 7423 |
| 11 (comparative) | 100 | — | 100 | 9380 |

The viscosity values in Table 4 confirm the conclusions above; that is, the mixtures of Examples 8-10 combining small amounts of C1 with FD, present in all cases a significantly reduced viscosity when compared with the mixture without any calcium carbonate material (Example 11). In addition, they further evidence the correlation of the viscosity reduction of the mixtures of the Examples with the amount of calcium carbonate material in the micronized powder. That is, Example 8 with the highest amount of calcium carbonate demonstrated a lower viscosity than those examples with lower amounts of calcium carbonate, e.g., Examples 9 and 10.

The colorimetry of three different hardened mixtures comprising micronized powder and UPR resin 3 was measured as described above. The contents of FD, C2 and C3 in the micronized powder mixtures in these examples is shown as weight percentages in Table 5, as well as the colorimetry CIELAB coordinates.

TABLE 5

| Example | FD wt % | C2 wt % | C3 wt % | L* | a* | b* |
| --- | --- | --- | --- | --- | --- | --- |
| 12 | 100 | — | — | 57.7 | 1.3 | 2.5 |
| 13 | 90 | 10 | — | 64.9 | 1.1 | 2.8 |
| 14 | 90 | — | 10 | 65 | 1.1 | 3.3 |

The colorimetry CIELAB coordinates express color as three values: L* for perceptual lightness and a* and b* for the four unique colors of human vision: red, green, blue, and yellow. For perceptual lightness L*, it defines black as 0 and white as 100. The a* axis is relative to the green-red opponent colors, with negative values toward green and positive values toward red. The b* axis represents the blue-yellow opponents, with negative numbers toward blue and positive toward yellow. In Table 5, the colorimetry CIELAB coordinates of Examples 13 and 14 show a greater whiteness compared to Example 12 on the perceptual lightness L* scale. In addition, Examples 13 and 14 show different positions between red and green, and yellow and blue. These results support that a synergistic effect exists when calcium carbonate material is incorporated in the mixtures with the FD. When the calcium carbonate material—C2 or C3—is added, in addition to the decrease in the viscosity of the unhardened mixtures described above, synergistically the hardened mixtures are also whiter (Examples 13 and 14, compared to Example 12). The increased perceptual lightness L* can be highly beneficial, for example, when artificial agglomerate stone of high whiteness is sought, potentially reducing the need of commonly used whitening dyes or pigments.

In Examples 15-17, the resin absorption (using UPR resin 4) of three micronized powder mixtures with FD, C2 and C3 was measured as described above. The contents of each component and the values obtained are depicted in Table 6. The higher the value of absorption in g/100 g powder, the higher the amount of resin needed to reach the same paste consistency. From those values, it can be concluded that micronized powders comprising 10 wt % calcium carbonate material in addition to micronized feldspar, require about 12% less resin to achieve the saturation point, as compared to when only FD is used as micronized powder.

TABLE 6

| Example number | FD wt % | C2 wt % | C3 wt % | Resin absorption (g resin/100 g powder) |
|---|---|---|---|---|
| 15 | 100 | — | — | 6.7 |
| 16 | 90 | 10 | — | 5.9 |
| 17 | 90 | — | 10 | 5.9 |

Industrial Trials

Silestone® products are artificial agglomerated stone slabs manufactured by vacuum vibrocompactation (using Bretonstone® technology) and commercialized by the Spanish company Cosentino S.A.U. Silestone® comprises different amounts of inorganic fillers with particle size 0.1-2 mm and micronized inorganic fillers (or micronized powder) with a particle size <100 micrometers, together with 5-15 wt % of an unsaturated polyester resin.

Three different Silestone® product references were manufactured in the production lines of Silestone®. For each of the three references, in one Example 18 (comparative) the slabs were produced with a micronized powder of sodium feldspar as described in the embodiments herein, while in other Example 19, the micronized powder was formed by a mixture of 90 wt % sodium feldspar and 10 wt % C2, while keeping all other parameters unchanged. In both Examples 18 and 19, the slabs could be manufactured without problems, although it was observed that the mixtures in Example 18 needed longer to homogenize than in Example 19. The mixtures in Example 19 seemed "wetter", had an apparent higher tendency to flow and where easier to mix, and even, the resin content of the mixture could be slightly reduced compared to Example 18 without affecting the properties of the slabs obtained.

The properties of the slabs obtained from Examples 18 and 19 were examined and compared, and they provided similar results regarding their impact resistance, flexural strength, thermal degradation, resistance to abrasion, hydrolysis and UV degradation. Also, the resistance of the slab surfaces to chemical attacks by acids, bases, solvents or pigments is not changed between Examples 18 and 19.

The invention claimed is:

1. An artificial agglomerated stone comprising:
   a) from 5 wt %-15 wt % of a hardened organic resin, based on the weight of the agglomerated stone,
   b) from 70 wt %-90 wt % of inorganic fillers with a particle size ranging from 0.1 mm-2 mm, based on the weight of the agglomerated stone, and
   c) from 5 wt %-25 wt % of micronized inorganic fillers with a particle size <100 micrometers, based on the weight of the agglomerated stone,
   wherein the micronized inorganic fillers comprise:
   c') from 50 wt %-98 wt % of feldspar, based on the weight of the micronized inorganic fillers, and
   c") from 2 wt %-30 wt % of a calcium carbonate material, based on the weight of the micronized inorganic fillers.

2. The artificial agglomerated stone according to claim 1, wherein the micronized inorganic fillers comprise:
   c') 70 wt %-95 wt %, based on the weight of the micronized inorganic fillers, of feldspar, and
   c") 5 wt %-30 wt %, based on the weight of the micronized inorganic fillers, a calcium carbonate material.

3. The artificial agglomerated stone according to claim 1, wherein the micronized feldspar c') has a particle size D90 <50 micrometers.

4. The artificial agglomerated stone according to claim 1, wherein the micronized calcium carbonate material c") has a particle size D90 <30 micrometers.

5. The artificial agglomerated stone according to claim 1, wherein the micronized feldspar c') is sodium feldspar.

6. The artificial agglomerated stone according to claim 1, wherein the micronized feldspar c') comprises from 60 wt %-73 wt % of $SiO_2$, from 17 wt %-22 wt % of $Al_2O_3$ and from 8-12 wt % of $Na_2O$, based on the weight of the feldspar.

7. The artificial agglomerated stone according to claim 1, wherein the micronized feldspar c') comprises the following combination of oxides:

| | |
|---|---|
| $SiO_2$ | from 64 wt %-71 wt. % |
| $Al_2O_3$ | from 17 wt %-21 wt. % |
| $Na_2O$ | from 9 wt %-12 wt. % |
| CaO | from 0 wt %-6 wt. % |
| $K_2O$ | from 0 wt %-2 wt. % |
| $Fe_2O_3 + TiO_2$ | from 0 wt %-0.3 wt. % | based on the weight of the feldspar.

8. The artificial agglomerated stone according to claim 1, wherein a weight ratio of micronized feldspar c') to micronized calcium carbonate material c") is from 75:25 to 97:3.

9. The artificial agglomerated stone according to claim 1, wherein the inorganic fillers with a particle size of 0.1 mm-2 mm b) are selected from stone, ceramic materials, and mixtures thereof.

10. The artificial agglomerated stone according to claim 1, wherein the calcium carbonate material has a $CaCO_3$ content of at least 80 wt %, based on the weight of the calcium carbonate material.

11. The artificial agglomerated stone according to claim 1, wherein the total amount of inorganic fillers b) and c) is from 85 wt %-95 wt %, based on the weight of the agglomerated stone.

12. The artificial agglomerated stone according to claim 1, further comprising from 5 wt %-12 wt % of organic resin.

13. The artificial agglomerated stone according to claim 12, wherein the organic resin is an unsaturated polyester resin.

14. The artificial agglomerated stone according to claim 1, wherein the artificial agglomerated stone is comprises a crystalline silica content of ≤50 wt %, relative to the weight of the artificial agglomerated stone.

15. The artificial agglomerated stone according to 1, wherein the micronized feldspar c') has a particle size D90 <40 micrometers.

16. The artificial agglomerated stone according to 1, wherein the micronized feldspar c') has a particle size D90 of 2-40 micrometers.

17. The artificial agglomerated stone according to claim 1, wherein the micronized calcium carbonate material c") has a particle size D90 <20 micrometers.

18. The artificial agglomerated stone according to claim 1, wherein the micronized calcium carbonate material c") has a particle size D90 of 0.2-20 micrometers.

19. The artificial agglomerated stone according to claim 1, where a weight ratio of micronized feldspar c') to micronized calcium carbonate material c") is from 80:20 to 95:5.

20. The artificial agglomerated stone according to claim 1, where the inorganic fillers with a particle size of 0.1 mm-2 mm b) are selected from quartz, feldspar, silicate glass, silicate frit, silica sand, feldspathic sand, mirror, granite, basalt, cristobalite, dolomite, marble, ceramic, and mixtures thereof.

21. The artificial agglomerated stone according to claim 1, wherein the calcium carbonate material has a $CaCO_3$ content of at least 90 wt %, based on the weight of the calcium carbonate material.

22. The artificial agglomerated stone according to claim 1, wherein the artificial agglomerated stone comprises a crystalline silica content of ≤40 wt %, relative to the weight of the artificial agglomerated stone.

23. A process for preparing an artificial agglomerated stone comprising:
 i) mixing a composition to form an unhardened mixture, wherein the composition comprises:
  a) from 5 wt %-15 wt % of a hardened unsaturated polyester resin, based on the weight of the composition,
  b) from 70 wt %-90 wt % of inorganic fillers with a particle size of 0.1-2 mm, based on the weight of the composition, and
  c) from 5 wt %-25 wt % of micronized inorganic fillers with a particle size <100 micrometers, based on the weight of the composition;
  wherein the micronized inorganic fillers comprise:
   c') from 50 wt %-98 wt % of feldspar, based on the weight of the micronized inorganic fillers,
   c") from 2 wt %-30 wt % of a calcium carbonate material, based on the weight of the micronized inorganic fillers;
 ii) vacuum vibrocompacting the unhardened mixture obtained in i) to form a compacted mixture, and
 iii) hardening the compacted mixture obtained in ii).

* * * * *

UNITED STATES PATENT AND TRADEMARK OFFICE
CERTIFICATE OF CORRECTION

| | |
|---|---|
| PATENT NO. | : 12,281,043 B2 |
| APPLICATION NO. | : 17/807167 |
| DATED | : April 22, 2025 |
| INVENTOR(S) | : Beatriz Alvarez Baladron et al. |

It is certified that error appears in the above-identified patent and that said Letters Patent is hereby corrected as shown below:

In the Claims

In Claim 14, Column 18, Line 62, "stone is comprises" should read --stone comprises--.

In Claim 15, Column 18, Line 65, "according to 1," should read --according to claim 1,--.

In Claim 16, Column 19, Line 1, "according to 1," should read --according to claim 1,--.

Signed and Sealed this
Twenty-fourth Day of June, 2025

Coke Morgan Stewart
*Acting Director of the United States Patent and Trademark Office*